United States Patent [19]
Koury

[11] Patent Number: 6,073,670
[45] Date of Patent: Jun. 13, 2000

[54] MULTIPLE FIBER PLACEMENT HEAD ARRANGEMENT FOR PLACING FIBERS INTO CHANNELS OF A MOLD

[75] Inventor: James L. Koury, Rio Rancho, N.Mex.

[73] Assignee: Isogrid Composites, Inc., Canada

[21] Appl. No.: 08/962,137

[22] Filed: Oct. 31, 1997

[51] Int. Cl.[7] .................................................. B65H 81/00
[52] U.S. Cl. ..................... 156/425; 156/433; 156/441; 156/523; 156/574
[58] Field of Search ..................................... 156/433, 441, 156/523, 522, 574, 173, 175, 169, 166, 425

[56] References Cited

U.S. PATENT DOCUMENTS

| | | | |
|---|---|---|---|
| 3,574,040 | 4/1971 | Chitwood et al. | 156/522 |
| 3,755,054 | 8/1973 | Medney | 156/441 X |
| 3,772,126 | 11/1973 | Myers | 156/441 X |
| 3,810,805 | 5/1974 | Goldsworthy et al. | 156/363 |
| 3,962,393 | 6/1976 | Blad | 264/109 X |
| 4,137,354 | 1/1979 | Mayes, Jr. et al. | 156/175 X |
| 4,285,752 | 8/1981 | Higgins | 156/523 X |
| 4,569,716 | 2/1986 | Pugh | 156/574 |
| 4,735,672 | 4/1988 | Blad | 156/433 |
| 5,074,950 | 12/1991 | Myers | 156/433 |

OTHER PUBLICATIONS

Evans, Don O., et al "Fiber Placement Process Study," SAMPE 34th Symposium Book of Proceedings, May 8–11, 1989, pp. 1–12.

*Primary Examiner*—Jeff H. Aftergut
*Attorney, Agent, or Firm*—Robert W. Becker & Associates

[57] ABSTRACT

A method and fiber-placement head are provided for placing fibers into a plurality of channels of a mold to form the ribs of a structural member, including panels, cylinders and cones, or even a ribbed latticework structure by itself. While providing relative movement between the mold and a plurality of fiber-placement heads, fibers are simultaneously placed into a number of the channels of the mold by means of the heads. The relative movement and placement is repeated as often as necessary in order to dispose into the channels a desired thickness of the fibers.

11 Claims, 11 Drawing Sheets

MULTIPLE FIBER PLACEMENT HEAD ARRANGEMENT FOR PLACING FIBERS INTO CHANNELS OF A MOLD

BACKGROUND OF THE INVENTION

The present invention relates to a method of automatically (robotically) placing fiber means into a plurality of channels of a mold to form the ribs of a structural member. The present invention also relates to a fiber placement head for use in placing fiber means, preferably automatically, into a plurality of channels of a mold utilizing a number of such heads.

So-called isogrid structures have been developed that are very advantageous in terms of weight and strength. Such composite isogrid structures comprise a ribbed latticework by itself, or with the addition of a skin or panel on one or both sides of the ribs. Such isogrid structures are formed by placing fiber means into the channels of a female mold. After completion of placement of the fiber means into the channels, the resulting latticework is cured, if necessary, and removed from the mold. A skin, such as a composite layer, can be placed on one side of the latticework and cured therewith prior to removal from the mold, or skin or panels can be placed on one or both sides after removal from the mold. Skin or panels can be secured to the ribs by, for example, an appropriate adhesive. The skin can, for example, be a preimpregnated tape or woven cloth. The panels can be made of any suitable material. Isogrid structures can be used for a variety of purposes. By way of example only, isogrid structures, be they in the form of panels, cylinders, cones or any other suitable shape, can be used for decking, shipping containers, walking bridges, housing material, automotive applications, shrouds, signs, support structures, wings and fuselages, nozzles, spacecraft structure, etc. The ribbed latticework by itself can be used, for example, as reinforcement for a poured structure, such as in concrete slabs.

Up till now, no quick and economical means have been available for placing fiber means into molds to form the ribbed isogrid latticework structure. Pursuant to some heretofore known approaches, fiber means have been placed into the mold one channel at a time. At best such procedures are at least partially manually performed. A procedure also known from conventional fiber placement systems uses reciprocating shoes that push and pull a wide band of fiber tows or tapes onto the top of the mold or into the mold channels. This known process is not continuous, it pulsates, and is very slow. In addition, the fiber placement systems are bulky and expensive. Applicant is not aware of any more relevant art, and certainly none that provides for an automatic, multiple head lay-down process.

It is therefore an object of the present invention to provide a continuous fiber placement method and fiber placement heads that are very time and cost effective.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The method of the present invention is characterized primarily by providing relative movement between a mold and the fiber-placement heads, while providing such relative movement simultaneously placing the fiber means into a number of the channels of the mold by means of the heads, and repeating the relative movement and placement as often as necessary to dispose into the channels a desired thickness of the fiber means, thus forming a lattice structure.

The fiber-placement head of the present invention is characterized by means for continuously withdrawing fiber means from a spindle or other supply thereof, means for guiding the fiber means into the channels of a mold, and means for compacting the fiber means in the channels.

Pursuant to the present invention, a plurality of such fiber-placement heads can be used in an apparatus that is characterized by means for providing relative movement between the heads and a mold, and means for automatically controlling the heads and the relative movement between such heads and the mold.

The inventive method and fiber-placement heads make it possible to significantly reduce the time and cost for disposing fiber means simultaneously into a number of the channels of a mold to form the ribs of a structural member. In particular, by the use of several such heads, the number of passes required to effect placement of the fiber means into the mold channels is reduced. In other words, a multiple lay-down process of fiber means into the mold channels is provided. In addition, by reducing manual operations in conjunction with the placement of the fiber means into the mold channels, the time for effecting such fiber placement is greatly reduced, as is the cost for the overall production.

Further specific features of the present invention will be described in detail subsequently.

DESCRIPTION OF PREFERRED EMBODIMENTS

Figure 1:
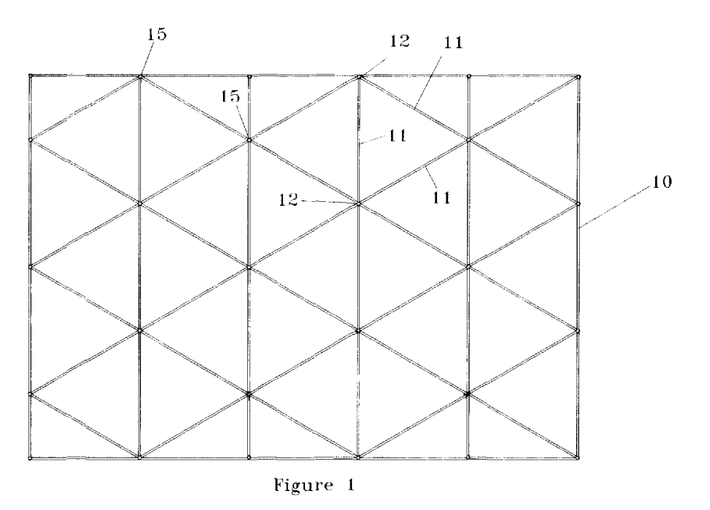
FIG. 1 shows one exemplary embodiment of a female mold with channels used for practicing the method and apparatus of the present invention.

Referring now to the drawings in detail, an example of an isogrid mold used in conjunction with the method and apparatus of the present invention is shown in FIG. 1. This mold is indicated generally by the reference numeral 10, and is a female mold cast from a male mold designed for a particular application, or can also be made from a solid or hard material using a cutting device such as a router. The mold can be made of polymeric material, including rubber and foam, or can be made of some other material, such as particle board. The aforementioned male mold can be a metallic isogrid-patterned casting tray that is machined. However, it would also be possible to provide a composite male mold using a stereolithography mold process. The female mold 10 can then be cast by pouring polymeric material, such as SILASTIC, therein and allowing the casting tray and SILASTIC silicone rubber to cure, for example, at room temperature for 24 hours, to form the female mold.

Grooves or channels 11 are disposed in one surface of the mold 10 and form the isogrid design. These channels 11 extend in three different directions, preferably at 60° relative to one another, e.g. +60, −60, and 0, so as to form triangles between them, preferably equilateral triangles. The embodiment of the mold 10 shown in FIG. 1 is a flat mold. Other shapes of the mold 10 are also possible, and will be discussed in detail subsequently.

Figure 2:
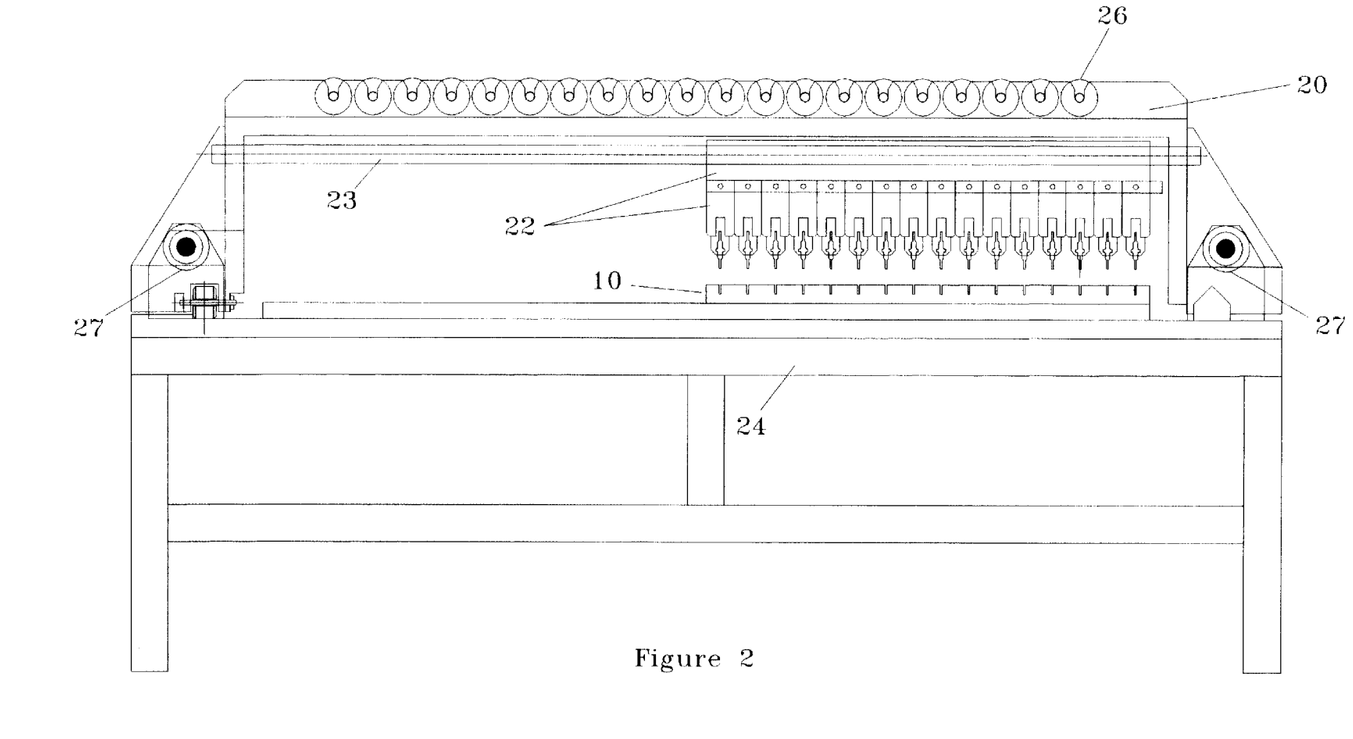
FIG. 2 is a front view of a table and gantry for placing fiber means into the mold of FIG. 1.

The following discussion will first be made in conjunction with the production of a flat panel using the flat female mold 10 of FIG. 1. In order to place fiber means into the channels 11 of the mold 10, the mold is placed on an X, Y, Z computer table as illustrated in FIG. 2; in this embodiment, the gantry 20 completes the form of the X, Y, Z table. An isogrid structure, such as a panel, is now ready for initial fabrication by having respective preimpregnated fiber means, for example in the form of fiber tows, placed into the grooves or channels 11, and the nodes 12, of the mold 10. This is accomplished in an automatic manner by means of a plurality of fiber placement head assemblies 22, which will be described in greater detail subsequently. The fiber placement head assemblies, or heads, 22 are movable relative to the mold 10 in order to place fiber means into the channels 11 in several different directions. For example, the heads 22 are disposed on the head transport shaft 23 in such a way as to be movable thereon. In addition, the gantry 20 is movable on a base portion 24 thereof both in a direction perpendicular to the shaft 23 and at an angle thereto. Spindles or spools 26 of impregnated fiber means are also disposed on the gantry 20 by means of appropriate brackets. From the top view of FIG. 3, it can be seen that a movement of the heads 22 at an angle to both the shaft 23 and the track means 27, in order to place fiber means in the angled channels 11, is accomplished by moving the heads 22 not only along the shaft 23 but also in a direction perpendicular thereto on the track means 27. This is accomplished by the motors 28, which are computer driven, for controlling and moving the heads 22 and the gantry 20. It would also be possible to dispose a mold 10 on the table in such a way that rather than being stationary, the mold is movable. Thus, for example, the mold 10 could be movable in two directions perpendicular to one another, or the mold could be movable in one direction while the heads 22 are movable in a direction perpendicular thereto, thereby being able to place fiber means into all of the channels 11 of the mold 10.

Figure 4:
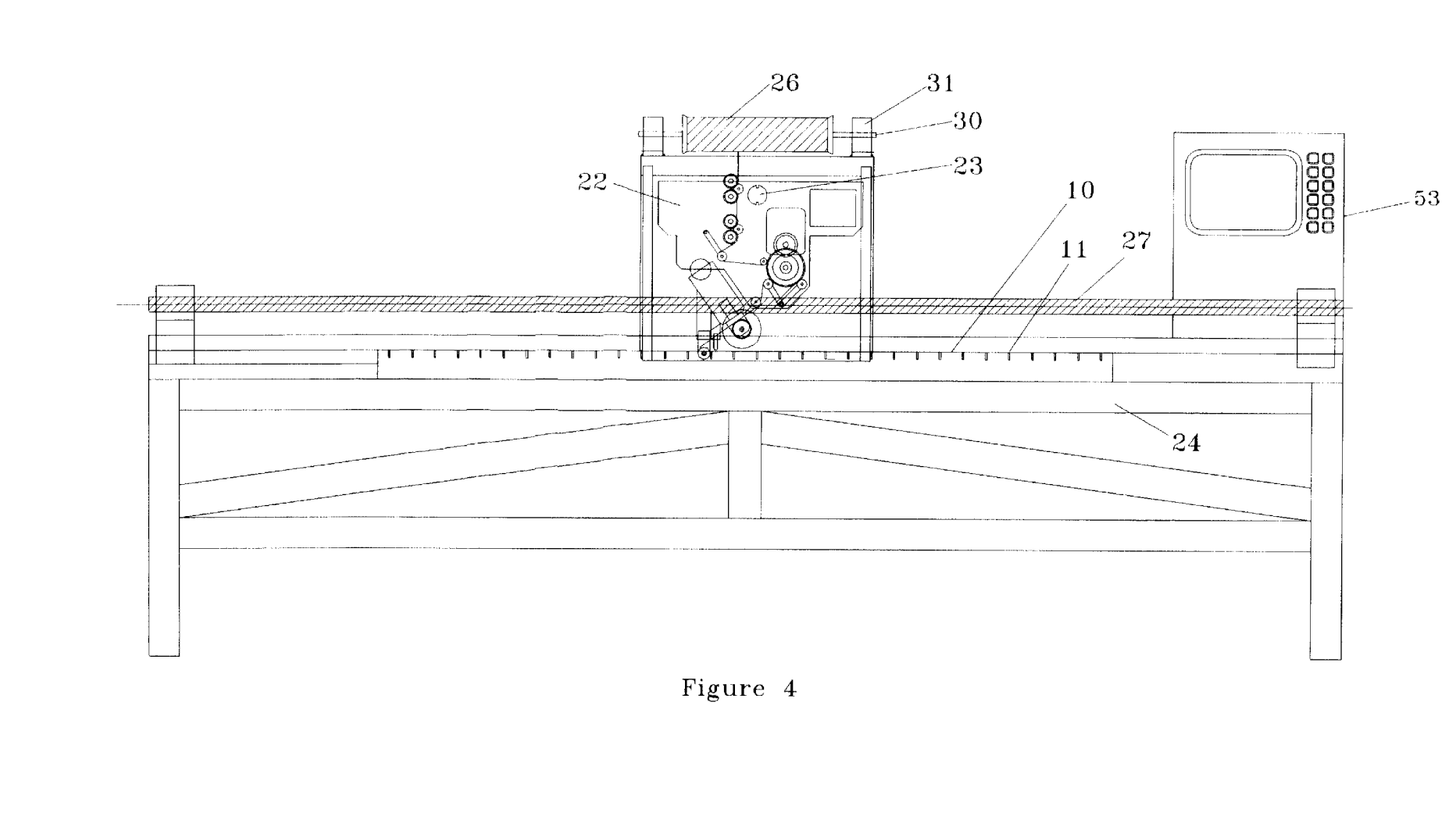
FIG. 4 is a side view of the apparatus of FIG. 2.

FIG. 4 illustrates how the spindles 26 are respectively disposed on shafts 30 that are mounted in support means 31. This side view of the inventive apparatus also shows how the heads 22 travel along the shaft 23 and the track means 27 for placement of fiber means into the channels 11 of the mold 10. The number of spindles 26 should correspond to the number of heads 22, and are preferably moved with the heads.

Figure 5A:
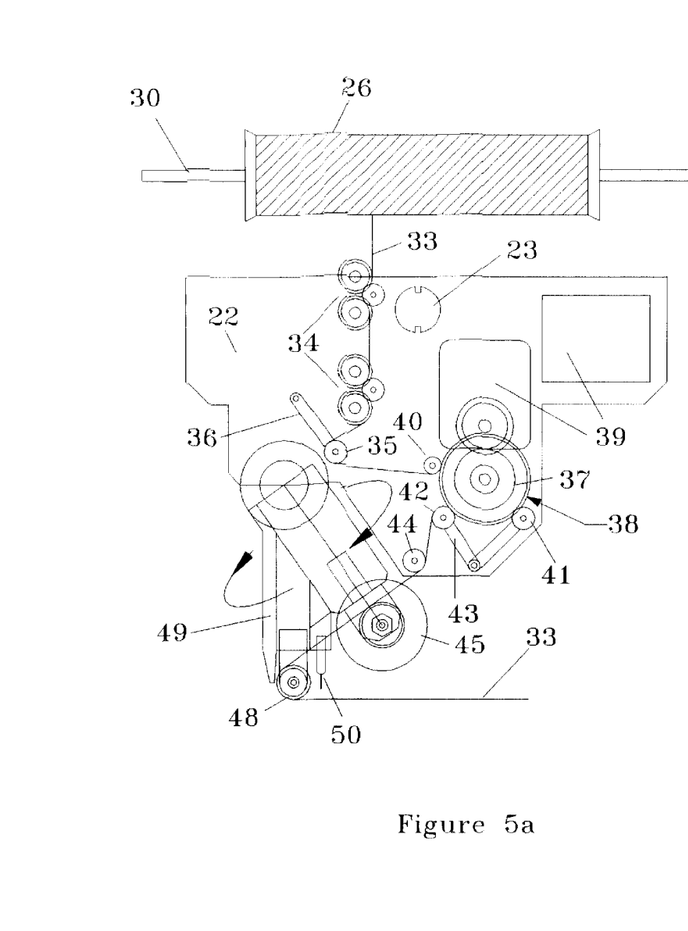
FIGS. 5a and 5b are detailed views showing two positions of the fiber placement head assembly of the present invention.
Figure 5B:
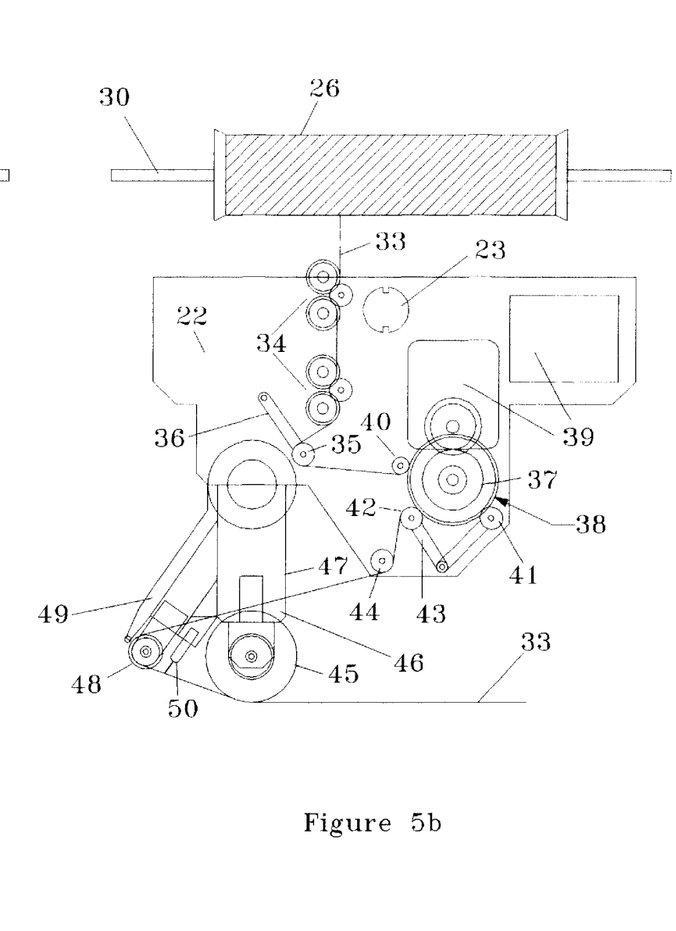

FIGS. 5a and 5b are detailed views showing two different positions of the fiber placement head assembly 22. The heads 22 allow for the placement, compaction, heating and cutting of the fiber means 33, such as a fiber tow or band of filaments impregnated with resin and stored and withdrawn from the respective spindles 26. The fiber means 33 is first fed through a series of guide rollers 34. The fiber means 33 is then passed about a guide roller 35 that is part of the rocker arm tensioning means or mechanism 36, such as a spring-supported or any other suitable tensioning means, for maintaining proper tension on the fiber means and for controlling the speed of the non-reciprocating wheel 37 of the continuous feed system 38. This wheel 37, which is driven by motor means 39, serves to continuously withdraw fiber means 33 from the spindle 26 and feed it through the fiber placement head assembly 22. Compaction rollers 40 and 41 are provided in order to help hold the tacky fiber means 33 against the wheel 37 and to prevent slippage of the fiber means relative to the wheel 37. The guide roller 42 is part of a further rocker arm tensioning means 43 that maintains the proper tension of the fiber means 33, whereby, by the means of a computer that reads the tension, the speed of the wheel 37 is adjusted to speed up or slow down feed of the fiber means if necessary. The two tensioning means 36 and 43 are preferably synchronized with one another and with the speed of the motor means 39, so that if the tension of the fiber means 33 is not within a specified range, appropriate adjustments can be automatically made. A further guide roller 44 is also provided.

During placement of the fiber means 33 into a channel 11 of the mold 10, a compaction roller 45 is lowered by means of the rocker and rotating arm assembly 46, which includes a pneumatic piston and solenoid motor 47. The pneumatic piston serves to control the pressure of the compaction roller 45, which ensures that the fiber means 33 is properly disposed in the channel 11 by applying appropriate pressure to the fiber means. A guide roller 48, such as a V-shaped guide roller, which is also disposed on the assembly 46, guides the fiber means 33 to the compaction roller 45. This guide roller 48 also serves for controlling the lay-down and flaring (if desired) of the fiber means 33 as well as cutting thereof. A curing means 49, such as a fiber optic tube, hot gas tube, etc., can be provided in order to partially cure or heat the fiber means 33, if desired, prior to placement thereof in the channel 11. A cutting means 50 is also provided in order to cut the fiber means 33 when the end of a channel 11 has been reached, as will be described in detail subsequently.

Pursuant to a presently preferred embodiment of the present invention, the number of fiber placement head assemblies 22 will correspond to the greatest number of channels 11 that extend in a given direction in the mold 10. For example, in the embodiment of the fiber placement system illustrated in FIG. 3, the number of heads 22 will correspond to the number of channels 11 extending in either angular direction. In such a case, it is then merely necessary, for each layer of fiber means 33, to make three passes with the fiber placement head assemblies 22 at the mold 10 in order to place the fiber means into the mold channels 11, namely once in each of the three directions in which the channels 11 extend. However, it is not absolutely necessary that the number of heads 22 correspond to the number of channels 11 in any given direction. For large molds, it may not be practical to do so. Nonetheless, multiple heads 22 will always be provided so that the number of passes in any given direction can be minimized, and the speed, and hence cost, of production of the isogrid structures will be very economical. Although, as indicated, the inventive process operates with multiple fiber placement head assemblies 22, the invention will now be explained in greater detail in conjunction with only one head 22.

Figure 3:
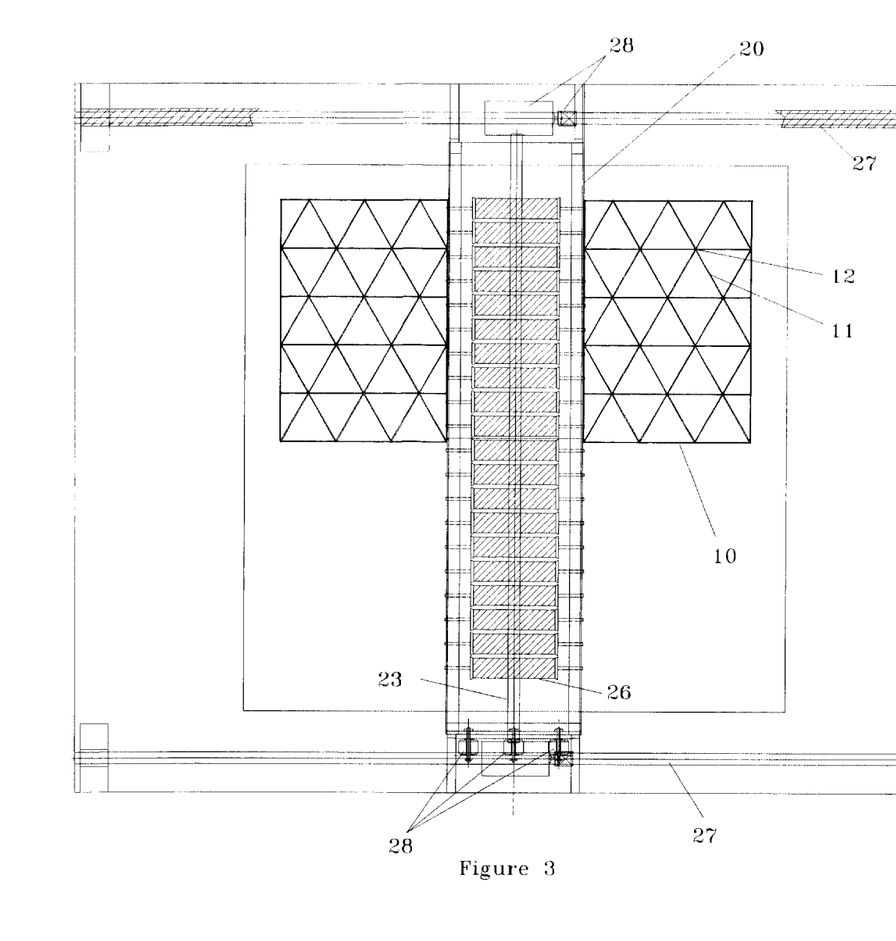
FIG. 3 is a top view of the apparatus of FIG. 2.

In FIG. 5a, the fiber placement head assembly 22 is shown in a position prior to lay-down of the fiber means 33. The head 22, as shown by the arrow, moves to the left as viewed in the drawing. In this position prior to lay-down, the compaction roller 45 is raised and the guide roller 48 is lowered. This guide roller 48 could be provided with "grabber means" for the fiber means 33, or could be provided with an appropriate surface that acts to "grab" the fiber means. As illustrated, the fiber means 33 has been threaded through the head assembly 22 and is ready to be placed into a channel 11. It should also be noted, as can be seen in FIG. 3, that not all of the channels 11, namely those that extend at an angle, are of the same length, so that varying lengths of fiber means are placed in the channels by their respective heads 22. The position of the head 22 illustrated in FIG. 5*a* is maintained, for example, until the edge of the mold 10 has been reached. However, if the fiber means 33 is to be flared, the position illustrated in FIG. 5*a* can be maintained for a longer period of time. In this context, the term flaring means that individual fiber means are to be separated from one another. This takes place near the edge of the mold 10 by means of a wider channel portion on the mold itself. Such flaring of the fiber means 33 is used, for example, to provide a means for either interconnecting isogrid structures or for connecting an isogrid structure to another structure. Other means for such connections are also possible and will be discussed in detail subsequently. In order to effect the flaring or separation of the fiber means 33, the rocker and rotating arm assembly 46 can be rotated as indicated in FIG. 5*a* in order to alter the position of the guide roller 48. When it is desired to compact the fiber means 33 within the channel 11, the guide roller 48 is raised and the larger compaction roller 45 is lowered, as shown in FIG. 5*b*. When the appropriate length of the fiber means 33 in the channel 11 has been achieved, either at the end of the channel or even beyond the channel, the fiber means 33 is cut by the cutting means 50; this is again accomplished in the position of the rollers indicated in FIG. 5*a*. Depending upon the conditions desired for the fiber means 33, such fiber means can be heated, for example to increase tackiness, or partially cured by the aforementioned means 49 prior to placement of the fiber means 33 into the channel 11.

Figure 1A:
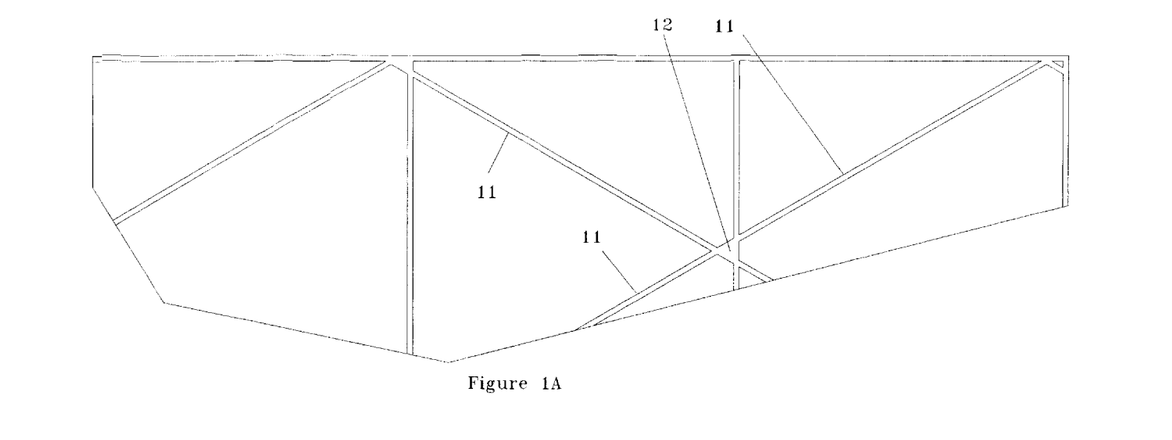
FIG. 1a is an enlarged view of several triangular nodal areas of the mold of FIG. 1.
Figure 6:
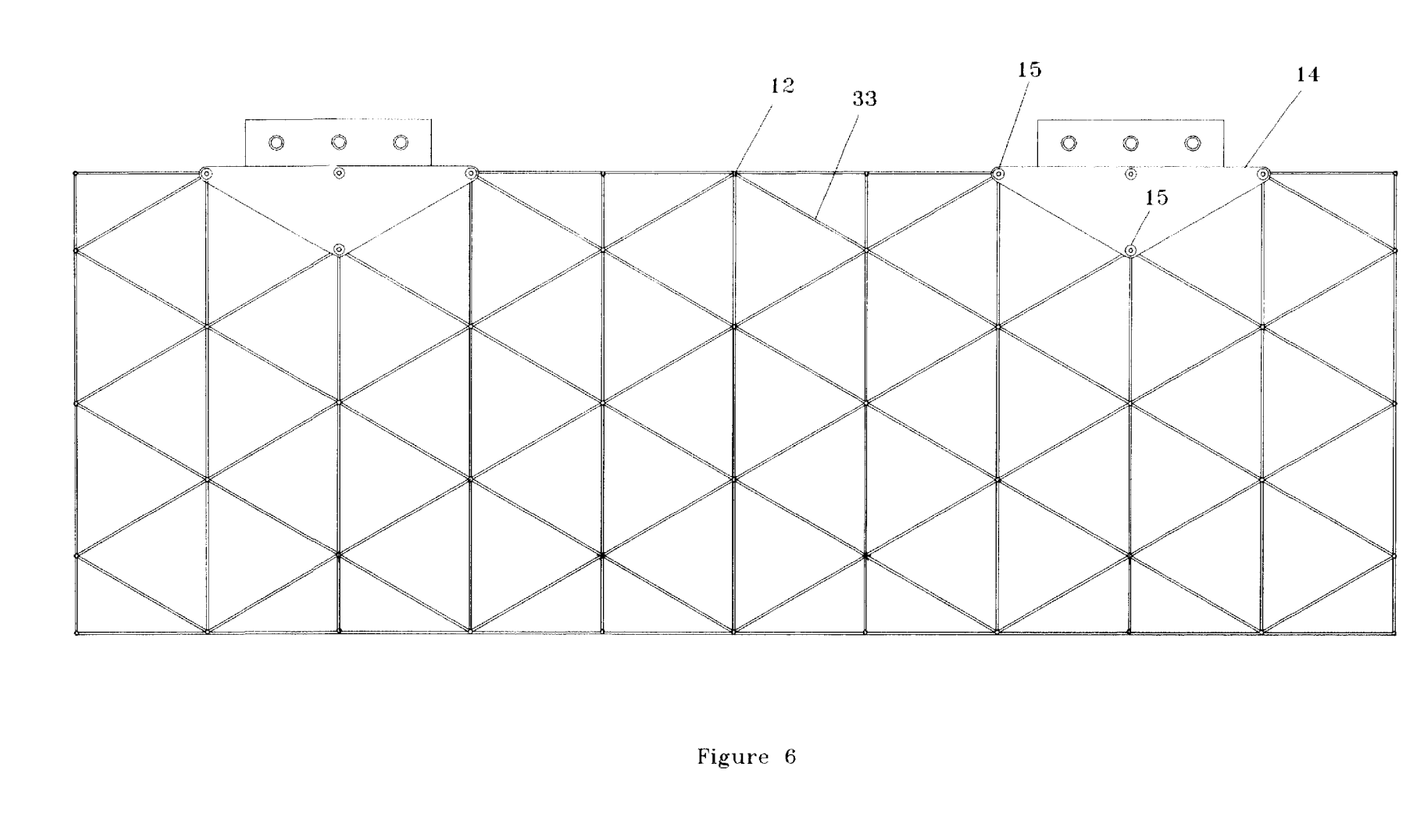
FIG. 6 shows one exemplary embodiment of a ribbed isogrid latticework structure without a skin covering, showing attachment means.

The foregoing procedure is repeated, either in the same direction or preferably in alternate directions for reasons to be discussed subsequently, as often as necessary in order to obtain the desired thickness of fiber means in the channels 11. In order to avoid thicker rib portions at the intersections of the channels 11 of the mold 10, these areas of intersection are provided with widened triangular nodes 12 (FIG. 1*a*) that allow the fiber means to spread out somewhat and prevent a build up at the intersection or cross-over points. Alternating the direction of fiber lay-down will also ensure that the fiber means 33 spread out evenly in the nodes 12. Furthermore, these nodal areas, which are then rich in resin, are critical for obtaining acceptable bonding to a skin or panel that is placed on the ribs. In addition, these nodal areas can also be used as attachment points, for example for mounting hinges, posts, electronic boxes, etc., (see for example the hinges 14 mounted on posts 15 in FIG. 6) and can also serve as a means to thereby interconnect isogrid structures to one another or to other structure. Structures could also be interconnected, for example, by I beam like means. After completion of placement of the fiber means 33 into the channels 11, the ribbed isogrid structure is complete, although as previously discussed, the structure can then be cured, skin can be attached or bonded thereon, etc. An example of the completed ribbed isogrid structure, without the presence of a skin thereon, is shown in FIG. 6. Although this structure is illustrated with the attachment means 14, the structure does not necessarily have to have attachment means. It should also be noted that attachment means could be attached to a skin or panel of such a structure, for example again via posts 15 or the like. Such posts 15 are shown also in FIG. 1, and can be inserted, for example, prior to curing of the fiber means 33 in the mold 10.

It should be noted that pursuant to one expedient embodiment of the present invention, the fiber means 33 can be placed into the channels 11 of the mold 10 by the heads 22 at a rate of 90 feet per minute. The fiber means 33 have a width, for example, of ¼ to ½ of on inch, although widths up to one inch could be accommodated. By way of example only, a typical flat panel size could be 3 feet by 4 feet or 3 feet by 5 feet.

The previous discussion has been made in conjunction with the placement of the fiber means 33 into the channels 11 of a flat mold 10. However, it is also possible pursuant to the present invention to use molds having any other desirable shape. For example, reference is now made to FIGS. 7–9, which illustrate the use of the present invention in conjunction with a cylindrical mold 10A. This mold can again be made from a polymeric material, for example a flexible material, which allows the mold to be wrapped to the desired shape. However, the mold 10A could also be a solid material having channels machined therein.

Figure 7:
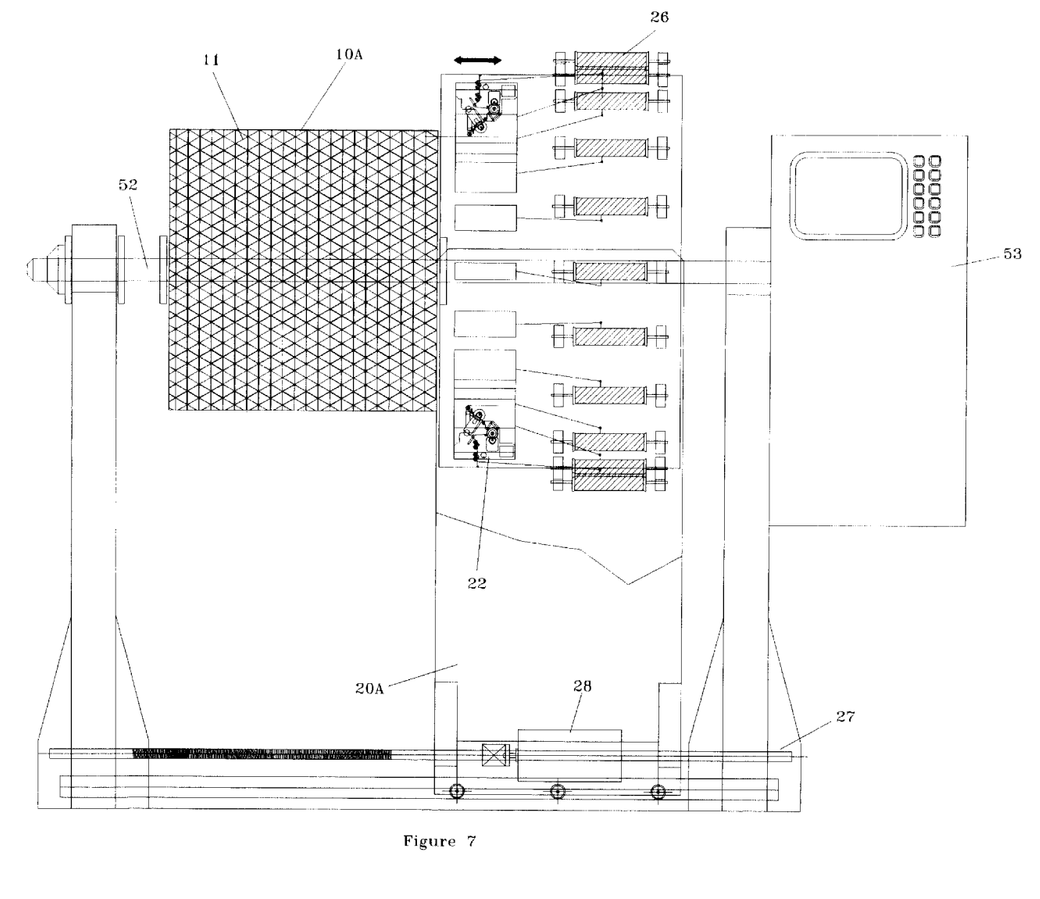
FIG. 7 is a side view of a further exemplary embodiment for processing a cylindrical mold.
Figure 8:
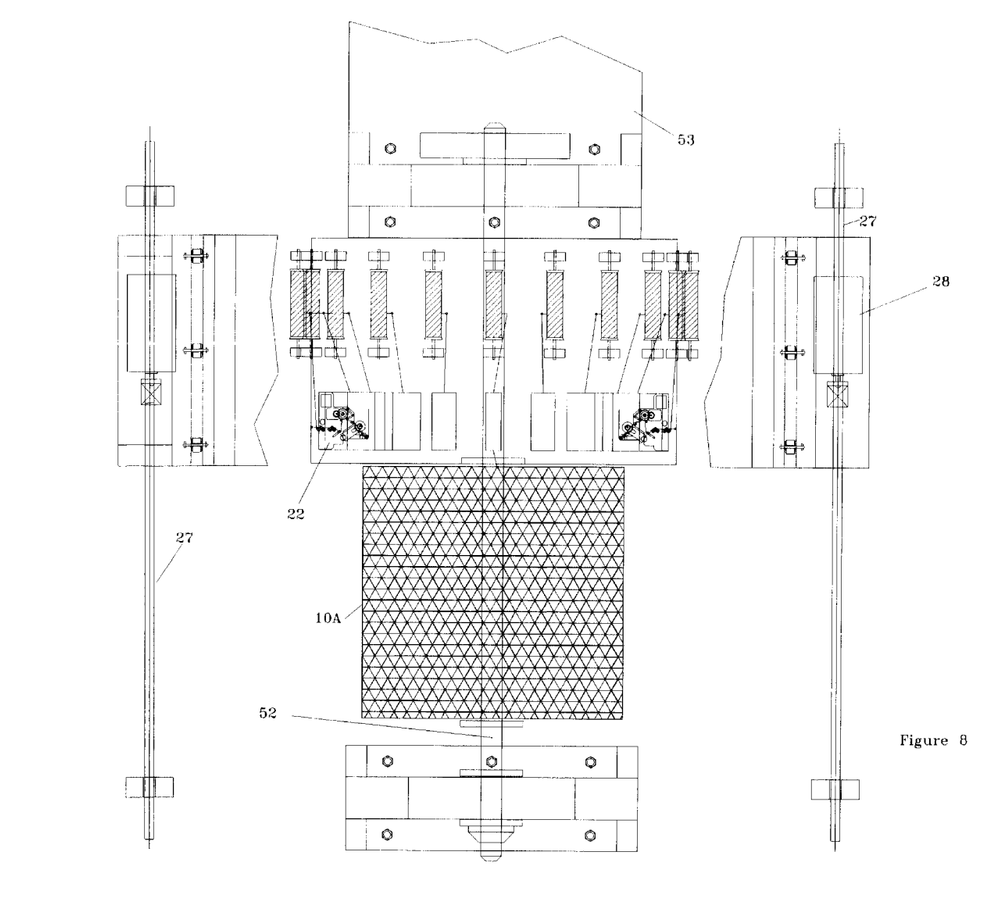
FIG. 8 is a top view of the apparatus of FIG. 7.
Figure 9:
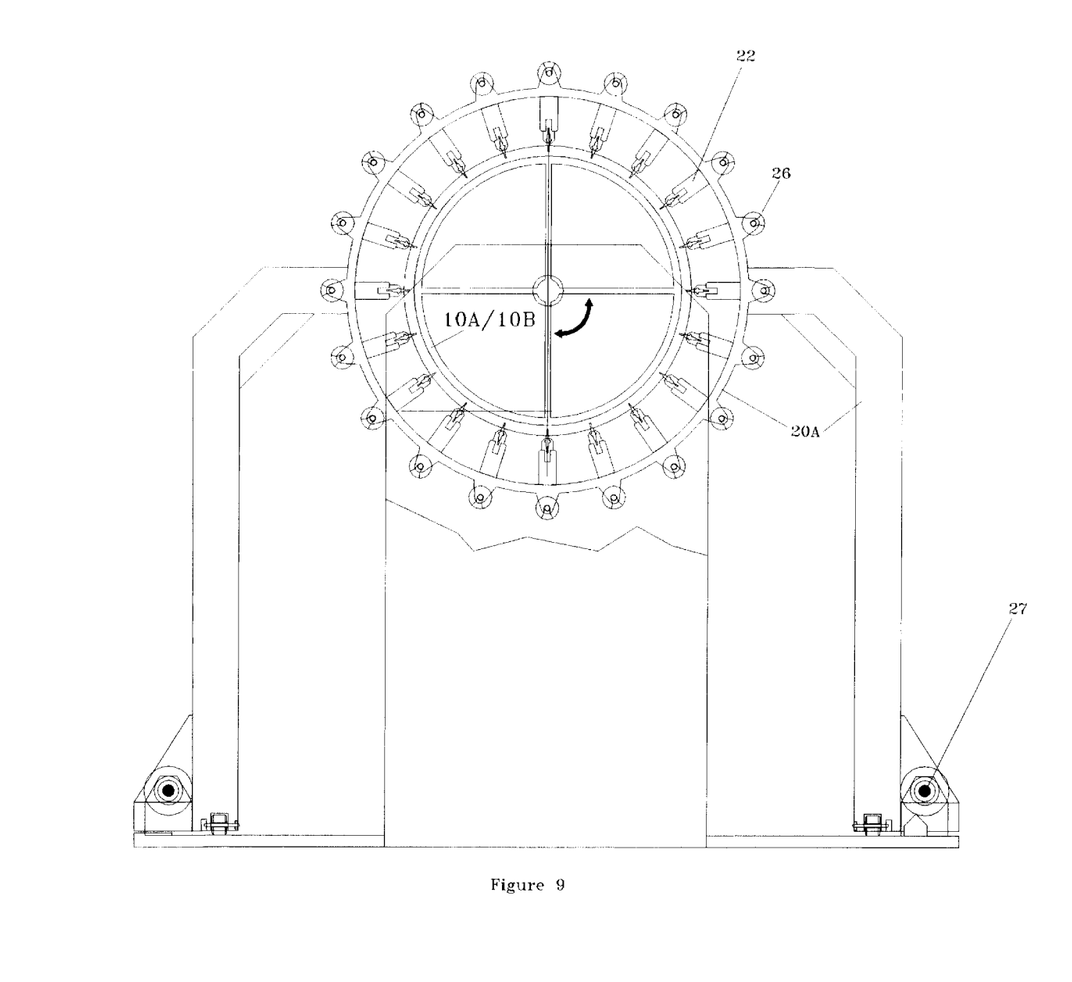
FIG. 9 is a front view of the apparatus of FIG. 7.

In FIG. 7, the mold 10A is disposed on a rotatable mandrel 52, which is motor driven. The fiber placement head assemblies 22 are disposed on a circular part of the gantry 20A, as shown in FIG. 9. The gantry 20A is mounted such that it can move on the track means 27, so that the gantry 20A, and hence the heads 22, can be moved in the direction of the double arrow of FIG. 7 in a direction parallel to the axis of the rotatable mandrel 52. Thus, by rotating the mold 10A on the mandrel 52, and/or by moving the heads 22 in a direction parallel to the axis of the mandrel 52, fiber means 33 can be placed into all of the channels 11 of the mold 10A using the heads 22 in the manner previously described.

Figure 10:
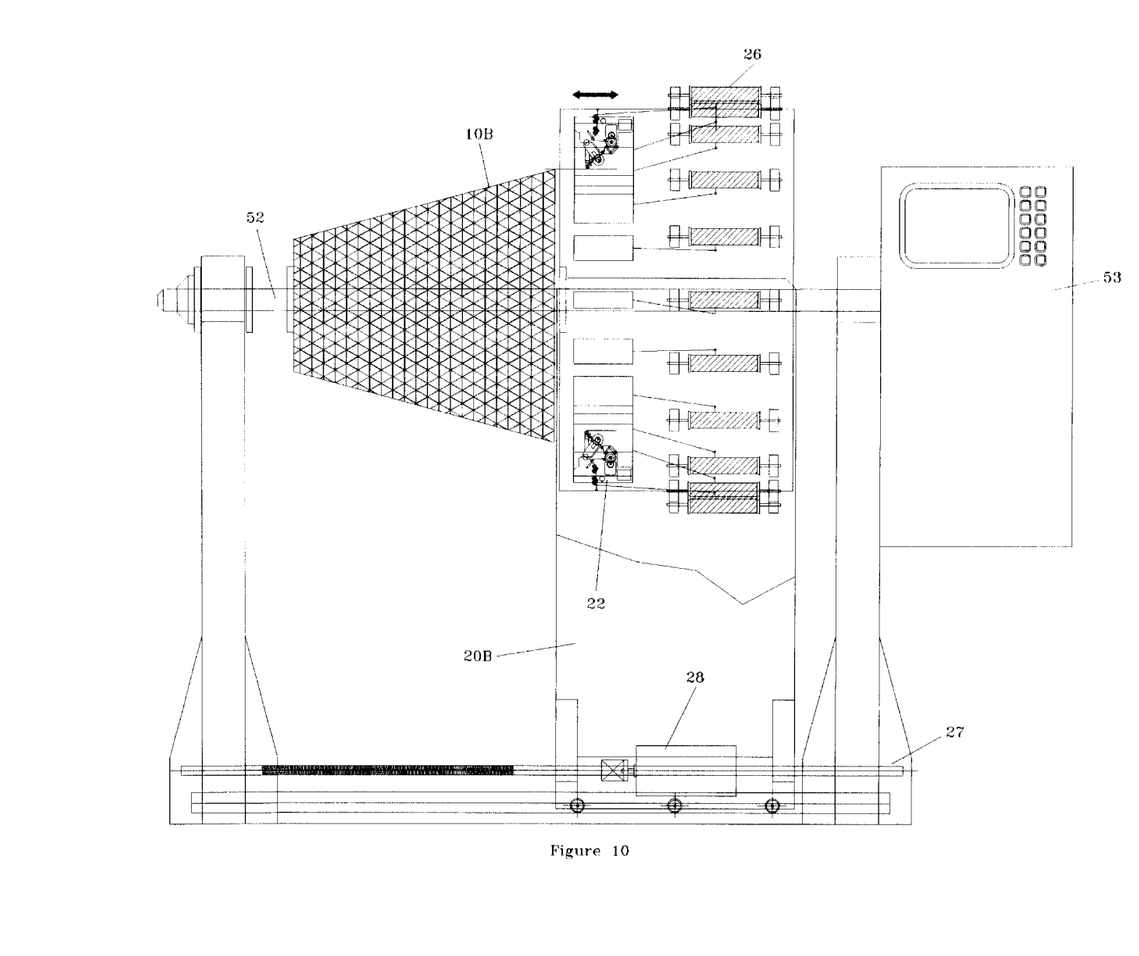
FIG. 10 is a side view of another embodiment of the present invention for processing a conical mold.
Figure 11:
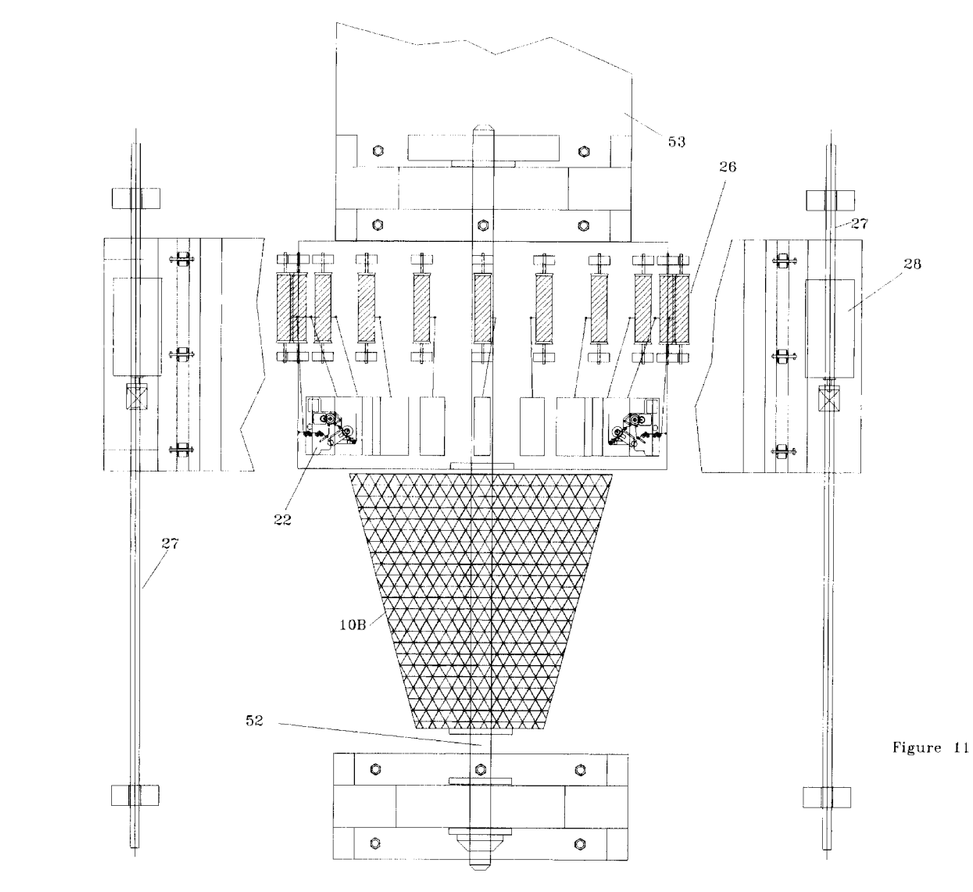
FIG. 11 is a top view of the apparatus of FIG. 10.

In a similar manner, the present invention can be used to produce a conical isogrid structure, as shown in FIGS. 10 and 11, as well as FIG. 9.

As indicated previously, the inventive process and fiber placement head assembly are intended to operate automatically. This is accomplished by means of a programmable controller, such as the controller 53 indicated in FIGS. 7, 8 and 10, 11. The controller 53 is programmed to respond to and control a number of operating parameters, including speed of feed of the fiber means 33 through the fiber placement head assemblies 22, speed of lay-down of the fiber means 33, the number of heads 22 that are operating, the length of fiber means 33 to be placed into the channels 11, the number of passes to be executed by the heads 22, etc. The controller 53 is programmed in conjunction with the specific isogrid structure being produced, and also responds to various operating parameters, including tension on the fiber means 33 in the heads 22, by means of appropriate sensors that feed information to the controller 23. Known means are provided for sensing and transmitting parameter values to said controller 53 as well as adjustment signals back therefrom to the head assembly 22 and other working components.

The fiber means 33 can be made of any suitable material, including glass, fiberglass, graphite, polyamide resins, etc. In addition, the fiber means can be in the form of fiber tows made up of a large number of individual filaments, they could be large individual filaments, or they could be bands made up of several fiber tows. The fibers are impregnated with varying types and amounts of resin, for example thermosetting, thermoplastic, and non-thermal cure resins, the selected quantity or proportion of which can vary depending upon the resin material and the particular application of the isogrid structure, especially whether or not skins or other panels are to be attached to the ribbed structure.

In view of the foregoing, it can be seen that this invention not only provides a new fiber placement method, but also provides a new head for realizing such a method, especially in an apparatus that carries the mold with its channels, all for producing an isogrid structure, for example in the form of panels, cylinders, cones or any other desired shape.

The present invention is, of course, in no way restricted to the specific disclosure of the specification and drawings, but also encompasses any modifications within the scope of the appended claims.

What I claim is:

1. A multiple fiber-placement head arrangement for placing fiber means simultaneously into a plurality of channels of a mold, to form ribs of a structural member, each of said heads comprising:

a single motor-driven wheel for continuously withdrawing fiber means from a supply means thereof and for feeding said fiber means through said fiber-placement head, said fiber means disposed about part of the circumference of said wheel;

guide rollers for guiding said fiber means through said fiber-placement head; and means for compacting said fiber means in said channels, wherein said wheel feeds said fiber means to said means for compacting.

2. A fiber-placement head arrangement according to claim 1, wherein said supply means comprises a respective spindle for said head.

3. A fiber-placement head arrangement according to claim 2, which includes at least one further guide roller for guiding said fiber means into said channels of said mold, and wherein said means for compacting comprises a compacting roller, with a pneumatic piston and solenoid motor assembly being provided for controlling movement and pressure to be exerted by said at least one guide roller and said compacting roller upon said fiber means.

4. A fiber placement head arrangement according to claim 3, which includes at least one tensioning means for adjusting tension on said fiber means as the same travels through said head.

5. A fiber placement head arrangement according to claim 4, which includes heating or curing means for said fiber means, and also includes cutting means for cutting said fiber means after placement thereof in a channel.

6. A fiber placement head arrangement according to claim 5, wherein said cutting means is disposed upstream of and adjacent to said compacting roller.

7. A fiber-placement head arrangement according to claim 1 that further comprises:

means for providing movement between said mold and said heads; and means for automatically controlling said heads and said relative movement.

8. A fiber-placement head and arrangement according to claim 7, wherein said means for providing relative movement is a gantry on which said heads are movably mounted.

9. A fiber-placement head and arrangement according to claim 8, wherein said gantry includes a rotatable mandrel for receiving said mold thereon.

10. A fiber-placement head and arrangement according to claim 8, wherein said means for automatically controlling said heads is a programmable controller for controlling operating parameters of said heads and of said relative movement between said mold and said heads.

11. A fiber placement head arrangement according to claim 1, which includes means for controlling the speed of said wheel such that said wheel maintains appropriate tension on said fiber means.

* * * * *

UNITED STATES PATENT AND TRADEMARK OFFICE
CERTIFICATE OF CORRECTION

PATENT NO : 6,073,670
DATED : June 13, 2000
INVENTOR(S) : James L. Koury

It is certified that error appears in the above-identified patent and that said Letters Patent are hereby corrected as shown below:

On the Title page, the following item should read as follows:

[Title]:

METHOD OF PLACING FIBERS INTO CHANNELS OF A MOLD AND FIBER PLACEMENT HEAD FOR ACCOMPLISHING SAME

Signed and Sealed this

Twenty-second Day of May, 2001

Attest:

NICHOLAS P. GODICI

Attesting Officer

Acting Director of the United States Patent and Trademark Office